(12) United States Patent
Shin et al.

(10) Patent No.: US 9,354,325 B2
(45) Date of Patent: May 31, 2016

(54) APPARATUS AND METHOD FOR ACQUIRING THE POSITION OF A PORTABLE TERMINAL

(75) Inventors: Gye-Joong Shin, Gyeonggi-do (KR); Do-Hyoung Chung, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 123 days.

(21) Appl. No.: 13/409,812

(22) Filed: Mar. 1, 2012

(65) Prior Publication Data
US 2012/0289257 A1    Nov. 15, 2012

(30) Foreign Application Priority Data

May 9, 2011    (KR) .......................... 10-2011-0043465

(51) Int. Cl.
*G01S 19/48* (2010.01)
*H04W 64/00* (2009.01)

(52) U.S. Cl.
CPC .............. *G01S 19/48* (2013.01); *H04W 64/00* (2013.01)

(58) Field of Classification Search
CPC . H04W 64/00; H04W 64/003; H04W 64/006; G01S 19/01
USPC ................................. 455/456.1, 4
See application file for complete search history.

(56) References Cited

U.S. PATENT DOCUMENTS

| | | | |
|---|---|---|---|
| 6,311,069 B1 * | 10/2001 | Havinis et al. | |
| 6,741,932 B1 * | 5/2004 | Groth et al. .................. | 701/117 |
| 7,710,318 B2 | 5/2010 | Wang et al. | |
| 8,451,766 B2 * | 5/2013 | Lee et al. | |
| 2005/0060091 A1 * | 3/2005 | Garin et al. | |
| 2007/0184850 A1 * | 8/2007 | Hupp et al. ................ | 455/456.1 |
| 2008/0051998 A1 * | 2/2008 | Wang | |
| 2009/0312026 A1 * | 12/2009 | Parameswar | |
| 2009/0318167 A1 * | 12/2009 | Pon et al. | |
| 2010/0039315 A1 * | 2/2010 | Malkos et al. | |
| 2010/0039323 A1 * | 2/2010 | Kosolobov et al. | |
| 2010/0105373 A1 * | 4/2010 | Kanade | |
| 2010/0113061 A1 * | 5/2010 | Holcman | |
| 2010/0197320 A1 * | 8/2010 | Ulrich et al. | |
| 2011/0250903 A1 * | 10/2011 | Huang et al. ............... | 455/456.1 |

* cited by examiner

*Primary Examiner* — George Eng
*Assistant Examiner* — Joseph Dean, Jr.
(74) *Attorney, Agent, or Firm* — Cha & Reiter, LLC

(57) ABSTRACT

An apparatus for acquiring a position of a portable terminal includes a position estimating unit for estimating a position of a portable terminal based on prestored reference information, and a control unit for detecting—the position of the portable terminal using information from a server, wherein when there is a failure to acquire the position information of the portable terminal using the information from the server, the position estimating unit acquires the position of the portable terminal based on the estimated position of the portable terminal.

15 Claims, 4 Drawing Sheets

APPARATUS AND METHOD FOR ACQUIRING THE POSITION OF A PORTABLE TERMINAL

CLAIM OF PRIORITY

This application claims priority under 35 U.S.C. §119 to an application filed in the Korean Intellectual Property Office on May 9, 2011 and assigned Serial No. 10-2011-0043465, the contents of which are incorporated herein by reference.

BACKGROUND OF THE INVENTION

1. Field of the Invention

The present invention relates generally to an apparatus and method for receiving a Global Positioning System (GPS) signal in a portable terminal.

2. Description of the Related Art

Portable terminals are being widely used as necessary articles of modern life style regardless of age and gender. Service providers and terminal manufacturers are developing a wide variety of products and services for differentiation and competitive edge.

Today, a portable terminal has evolved into a multimedia device to provide various services such as a phone book, a game, a Short Message Service (SMS), an Electronic (E)-mails, a morning call, a Motion Picture Expert Group Audio Layer-3 (MP3) player, a schedule managing function, a digital camera, and a wireless Internet service.

Also, the portable terminal readily provides a navigation function for receiving a GPS signal and connecting to a traffic information center through a mobile communication network to provide updated traffic news or route information to a user.

In order to use the navigation function, the portable terminal must receive a GPS signal through a GPS module to detect its own position. The portable terminal employing a GPS module may be called as a GPS receiver.

A method of detecting the position of the portable terminal varies according to the GPS mode used by the portable terminal.

If the portable terminal uses a stand-alone GPS mode, the portable terminal receives a GPS signal to determine the initial position. This process takes a long time in detecting the position of the portable terminal.

If the portable terminal uses an assisted GPS mode, the portable terminal receives position information about a base station (BS) from a position information providing server and then can quickly detect the position of the portable terminal corresponding to the received position information.

However, the portable terminal using an assisted GPS mode may be unable to communicate with the position information providing server due to poor network conditions.

If the portable terminal is unable to communicate with the position information providing server, the position information provided by the position information providing server may be lost. As a result, the portable terminal may fail to receive information used to detect the position of the portable terminal.

To address above drawbacks, there is a need for an improved way of detecting the initial position information that is used to detect the position of the portable terminal.

SUMMARY OF THE INVENTION

An exemplary aspect of the present invention is to provide an apparatus and method for improving the performance of measuring the position of the portable terminal using an assisted GPS mode.

Another exemplary aspect of the present invention is to provide an apparatus and method for estimating, by a portable terminal using an assisted GPS mode, the position of the portable terminal using stored reference information.

Another aspect of the present invention is to provide an apparatus and method for estimating, by a portable terminal using an assisted GPS mode, the position of the portable terminal using stored reference information, and then estimating the position of the portable terminal more accurately by position information received from a server.

Another aspect of the present invention is to provide an apparatus and method for estimating, by a portable terminal using an assisted GPS mode, the current position of the portable terminal by area-identifying reference information.

In accordance with an aspect of the present invention, an apparatus for acquiring a position of a portable terminal includes a position estimating unit for estimating a position of a portable terminal using stored reference information in the portable terminal, and a control unit for detecting the position of the portable terminal using information from a server, wherein when there is a failure to acquire the position information of the portable terminal using information from the server, the position estimating unit acquires the position of the portable terminal based on the estimated position of the portable terminal.

In accordance with another aspect of the present invention, a method for acquiring a position of a portable terminal receiving a Global Positioning System (GPS) signal includes estimating a location of a portable terminal by the portable terminal using stored reference information, detecting a position of the portable terminal using position information of the portable terminal from a server; and when there is a failure to detect the position information of the portable terminal using the position information of the portable terminal from the server, acquiring the position of the portable terminal using the estimated position of the portable terminal using the stored reference information.

In accordance with another aspect of the present invention a portable terminal for acquiring a position of a portable terminal includes a memory unit for storing reference information for each base station (BS) and a position estimating unit for estimating the position of a portable terminal based on the reference information, wherein the position estimating unit acquires the position of the portable terminal using the estimated position of the portable terminal based on the stored reference information if there is a failure in receiving position information from a server.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary aspects, features and advantages of the present invention will become more apparent to a person of ordinary skill in the art from the following detailed description when taken in conjunction with the accompanying drawings in which.

DETAILED DESCRIPTION

Exemplary embodiments of the present invention will be described herein below with reference to the accompanying drawings. For the purposes of clarity and simplicity, detailed descriptions of well-known functions or configurations will be omitted as they would unnecessarily obscure the subject matters of the present invention.

According to the teachings of the present invention, the inventive apparatus and method provides measuring the initial position of a satellite by a portable terminal using an assisted GPS mode. Briefly, the portable terminal estimates the initial position of a satellite by position information estimated by the portable terminal according to predetermined criteria, thereby preventing the estimation of the initial position of the satellite from being delayed because the portable terminal fails to receive position information from a position information providing server due to poor network conditions. A detailed explanation will be described hereinafter with reference to figures.

Figure 1:
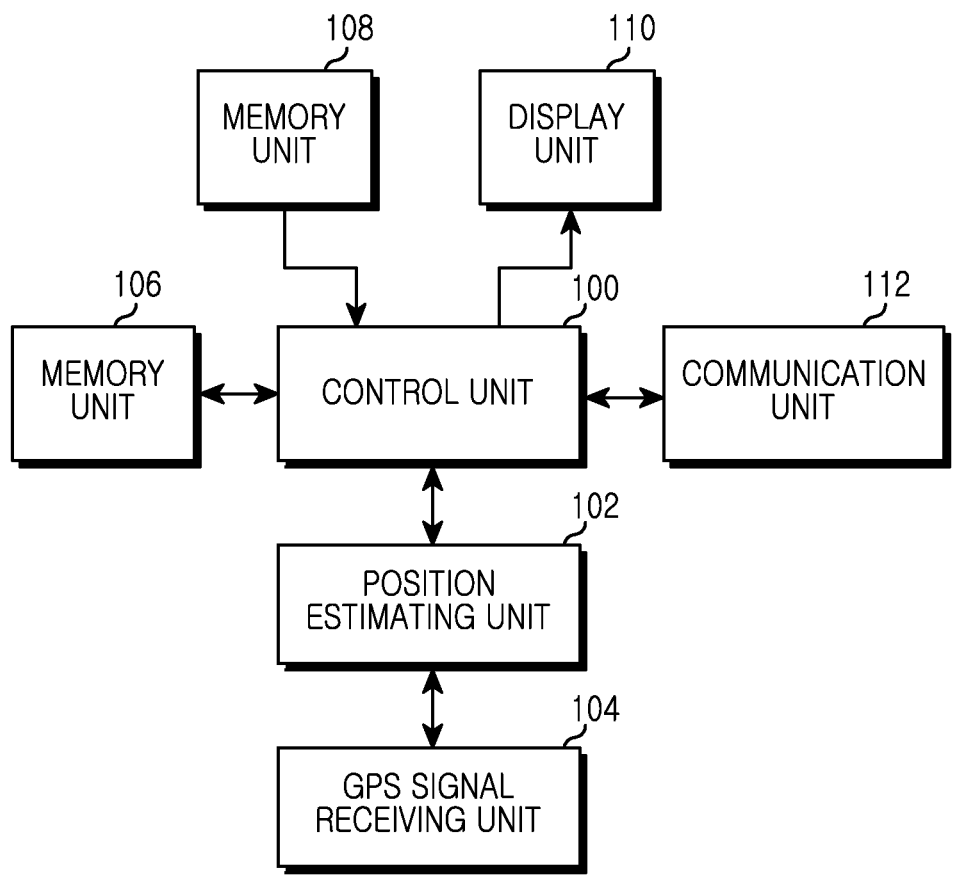
FIG. 1 is a block diagram of a portable terminal for improving the performance of measuring the position of a portable terminal according to an exemplary embodiment of the present invention.

FIG. 1 is a block diagram of a portable terminal for improving the performance of measuring the position of a portable terminal according to an exemplary embodiment of the present invention.

Referring to FIG. 1, the portable terminal may include a control unit (also called as a processor) 100, a position estimating unit 102, a GPS signal receiving unit 104, a memory unit 106, an input unit 108, a display unit 110, and a communication unit 112. In an alternate embodiment, the position estimating unit 102 may be embodied in the processor. Similarly, the functionality of two or more of the above units may be integrated into a single component. Further, the portable terminal may include additional units that are not illustrated here for sake of clarity.

In operation, the control unit 100 controls an overall operation of the portable terminal For example, the control unit 100 processes and controls voice communication and data communication.

In addition to the general functions, according to the present invention, the control unit 100 estimates the position of the portable terminal using stored reference information including area information corresponding to a base station which is in charge of coverage area in which the portable terminal is included. The area information is, for example, a country code or an area code corresponding to a base station or reference point information of a particular country code, a specific town code or a specific region, Also, the control unit 100 acquires the position of the portable terminal using position information received from a position information providing server (not shown).

In the embodiment, the control unit 100 acquires the position of the portable terminal according to the estimated position information of the portable terminal using the stored reference information if position information from the server is not possible. Thereafter, if receiving position information from the server is possible, the control unit 100 acquires the position of the portable terminal according to the position information of the position information providing server.

Note that the acquired position information of the portable terminal from the position information providing server is more accurate than the estimated position of the portable terminal using the stored reference information. Accordingly, when the portable terminal receives position information from the position information providing server while detecting an estimated position of the portable terminal based on prestored reference data, the control unit 100 stops the process of detecting the position of the portable terminal based estimated position of the portable terminal using the prestored reference data and detects the position of the portable terminal using the position information received from the position information providing server.

The position estimating unit 102 estimates the position of the portable terminal under the control of the control unit 100. Here, the position estimating unit 102 may be included in the control unit 100. The position estimating unit 102 identifies information of a base station with which the portable terminal communicates. The information of the BS is known by the portable terminal during communication. The portable terminal is included in area coverage which a particular BS is servicing. Then, the position estimating unit 102 detects area information corresponding to the detected BS information using prestored reference information, which indicates the relation between the area information and the BS information. Accordingly, the position estimating unit 102 may determine the area in which the portable terminal is located using the area information corresponding to the BS information.

The GPS signal receiving unit 104 includes a GPS module. The GPS signal receiving unit 104 receives a GPS signal which may be used to detect the position of the portable terminal.

The memory unit 106 includes at least one of a ROM (Read Only memory), a RAM (Random Access Memory) and a flash ROM. The ROM stores various reference data and microcodes of a program for the process and control of the control unit 100 and the position estimating unit 102.

The RAM is a working memory of the control unit 100, which stores temporary data that are generated during the execution of various programs. The flash ROM stores various updatable data such as phone book, outgoing messages, and incoming messages. In addition, the memory unit 106 stores the reference information used to detect the current position of the portable terminal according to the present invention. Herein, the reference information may include a BS country code or an area code corresponding to a coverage including the portable terminal, a reference point of an area including the base station, and information about the area including the base station.

The input unit 108 includes numeric keys of digits 0-9 and a plurality of function keys, such as a Menu key, a Cancel key, a Confirmation key, a Talk key, an End key, an Internet connection key, Navigation keys (or Direction keys), and character input keys. The input unit 108 provides the control unit 100 with key input data that corresponds to a key pressed by the user. For example, the input unit 108 may generate input data for GPS signal reception. Also, as the input unit 108, a touch sensitive display (also, called as a touch screen) may be used.

The display unit 110 displays characters, moving pictures, still pictures and status information generated during an operation of the portable terminal. The display unit 110 may be a color Liquid Crystal Display (LCD), an Active Matrix Organic Light Emitting Diodes (AMOLED), and other types of thin-film technology screen display apparatuses. If the display unit 110 has a touch input device and is applied to a touch input type portable terminal, it may be used as an input device.

The communication unit 112 transmits/receives Radio Frequency (RF) signals inputted/outputted through an antenna (not illustrated). For example, in a transmitting (TX) mode, the communication unit 112 channel-encodes, spreads and RF-processes TX data prior to transmission. In a receiving (RX) mode, the communication unit 112 converts a received RF signal into a baseband signal and despreads and channel-decodes the baseband signal to restore the original data. In addition, for the operation of the GPS signal receiving unit 104, the communication unit 112 receives position information of the portable terminal used to estimate the initial position of a satellite. That is, a BS ID corresponding to the coverage including the portable terminal is provided through the communication unit 112 to the position information providing server to request the position information, and the position information received from the position information providing server is used to estimate the position of the satellite.

The above configurations should be considered in descriptive sense only and not for the purpose of limitation, and those skilled in the art will understand that various changes may be made therein without departing from the scope of the present invention. For example, although separate units such as the position estimating unit 102 are provided for respective functions of the control unit 100, the control unit 100 may be configured to also perform all or some of the respective functions on behalf of such separate units.

Figure 2:
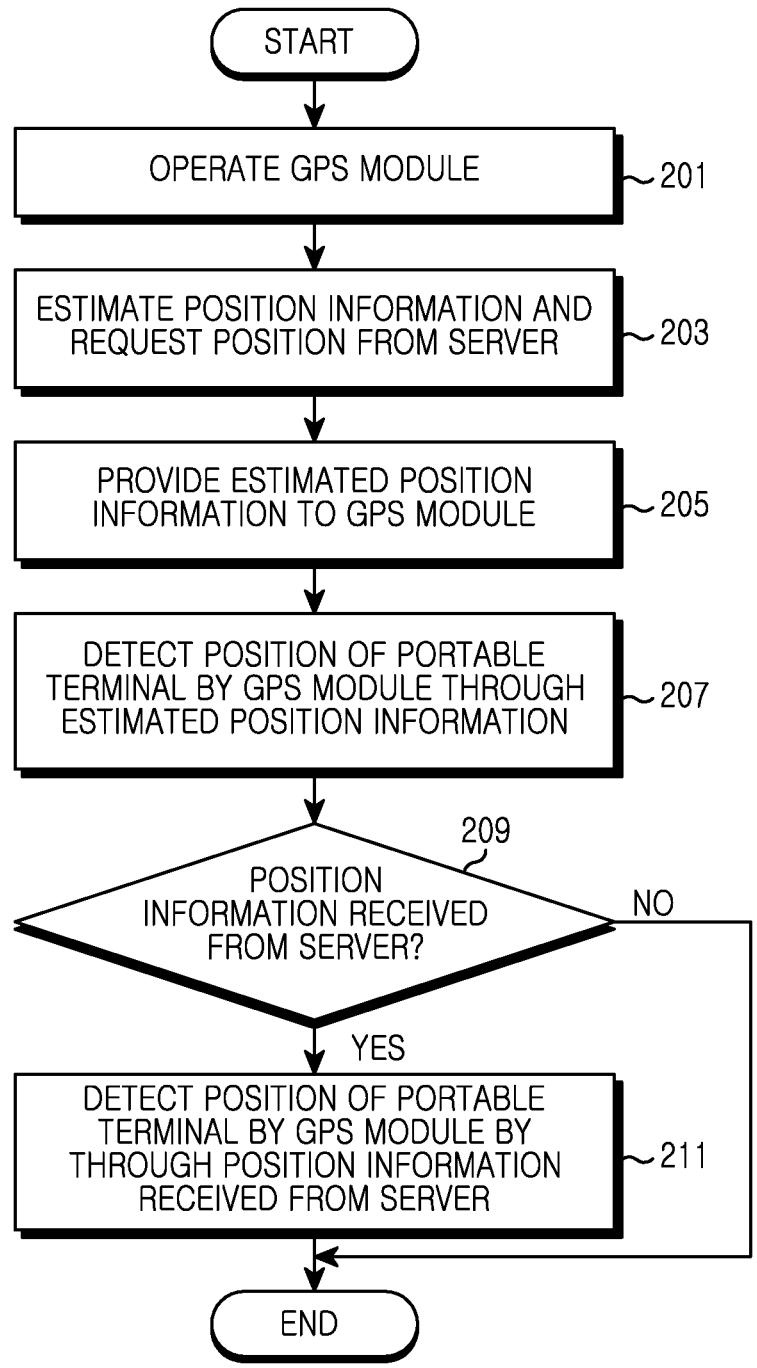
FIG. 2 is a flow diagram illustrating a process for estimating the position of a portable terminal according to an exemplary embodiment of the present invention.

FIG. 2 is a flow diagram illustrating a process for estimating the position of a portable terminal according to an exemplary embodiment of the present invention.

Referring to FIG. 2, the portable terminal represents any portable terminal using an assisted GPS mode. In step 201, the portable terminal operates a GPS module (a GPS signal receiving module) to receive a GPS signal.

In step 203, the portable terminal estimates position information of the portable terminal using prestored reference information and simultaneously (or subsequently or prior to the estimation) requests position information from a position information providing server. In general, a portable terminal using an assisted GPS mode provides a BS (base station) ID (Identification) to a position information providing server to inquire the position of a base station, and in response, the position information providing server provides latitude/longitude information of the base station corresponding to the BS ID to the portable terminal. As a result, a portable terminal requests position information from a position information providing server to rapidly detect its position. However, when network conditions are poor, a packet loss may occur between the portable terminal and the position information providing server, or when an error occurs in the position information providing server, the portable terminal may fail to receive the latitude and longitude information about the BS ID, thus taking a long time to detect the position of the portable terminal due to transmission errors.

In order to solve the above problem, the portable terminal according to the present invention estimates its own position information based on prestored reference information, in step 203, and acquires the position of the portable terminal when failing to receive the position information from the position information providing server. The portable terminal may prestore reference information corresponding to a particular BS. This will be described below in detail later with reference to FIG. 3.

In step 205, the portable terminal provides the estimated position information based on the prestored reference information to the GPS module. Note that this step is performed before receiving position information from the position information providing server or when failing to receive the position information from the server.

In step 207, the portable terminal acquires the position of the portable terminal through the GPS module. Herein, the GPS module detects the initial position of the portable terminal based on the estimated position information.

In step 209, the portable terminal determines whether position information is received from the position information providing server. Herein, the portable terminal may operate a timer to determine whether it is capable of communicating with the position information providing server within a predetermined time period.

If position information is not received from the position information providing server (in step 209), the portable terminal determines that it is not capable of communicating with the position information providing server, and determines the position of the portable terminal based on the estimated position information.

On the other hand, if position information is received from the position information providing server (in step 209), the portable terminal proceeds to step 211. In step 211, the portable terminal determines the position of the portable terminal based on the information from the server through the GPS module. Here, the GPS module stops detecting the position of the portable terminal based on the estimated position information, and detects the position of the portable terminal by the position information received from the position information providing server.

Thereafter, the portable terminal ends the algorithm of the present invention.

Figure 3:
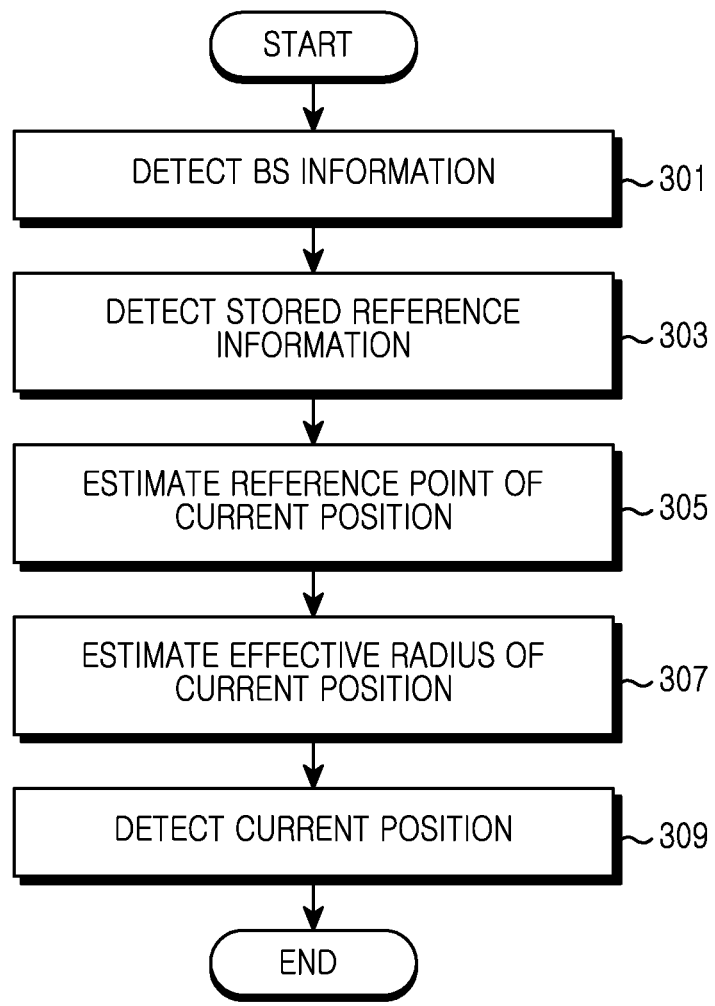
FIG. 3 is a flow diagram illustrating a process for estimating position information of a portable terminal according to an exemplary embodiment of the present invention.

FIG. 3 is a flow diagram illustrating the process for estimating position information by a portable terminal according to an exemplary embodiment of the present invention.

Referring to FIG. 3, the portable terminal prestores reference information for detection of the current position of the portable terminal. The reference information may be prestored by a manufacturer, or updated by a user of the portable terminal. As show in Table 1, the reference information may include a BS country code or a town area code corresponding to a coverage including the portable terminal, a reference point such as latitude and longitude of an area including the base station, and information about the area including the base station.

TABLE 1

| MCC (BS Country/town Code) | Reference Point (Latitude, Longitude) | Area Information (Radius around Reference Point) |
|---|---|---|
| 2 byte | 8 byte (4 byte, 4 byte) | 4 byte |

For example, the portable terminal may prestore area information about each country code and/or a town code and preliminarily estimate information about a country, town, or a particular area where the portable terminal is located. Herein, the portable terminal may store 14-byte information about each country, town, or a specific area, and may use a capacity of only about 3,206 bytes even when storing information about worldwide countries (229 countries) and their related towns. Here, the country code may be called as Mobile Country Code which is accepted as a widely accepted code in the telecommunication technology field.

Referring to Table 1, when the portable terminal detects a Korean BS country code '123', for example, the portable terminal may use Korean reference point information and area information (the radius of Korea around the reference point) to detect the position of a portable terminal.

In order to perform the above process, the portable terminal identifies BS information in step 310 and identifies prestored reference information corresponding to the identified BS information in step 303. The BS information is received by the portable terminal when a communication is established therebetween.

In step 305, the portable terminal acquires a reference point information of its current position based on the country code, town, or an area code provided in the reference information of the Table 1 for example. That is, the portable terminal may detect reference point information (latitude and longitude information) corresponding to a BS country code or town from the prestored reference information in order to determine the position of the portable terminal.

In step 307, the portable terminal acquires an effective radius of reference point. The radius of the reference point may be determined according to the expected degree of accuracy when stored by a manufacturer or a user of the portable terminal. Thus, the radius of reference point can be made smaller to correspond to a particular base station amongst base stations.

In step 309, the portable terminal detects its current position. Thereafter, the portable terminal ends the algorithm of the present invention.

As illustrative example shown in FIG. 3, the position of the portable terminal is according to the countries based on the country code. However, the present invention is not limited thereto and the position of the portable terminal may be acquired based on the city code or other codes responsive to narrower areas.

Figures 4A, 4B:
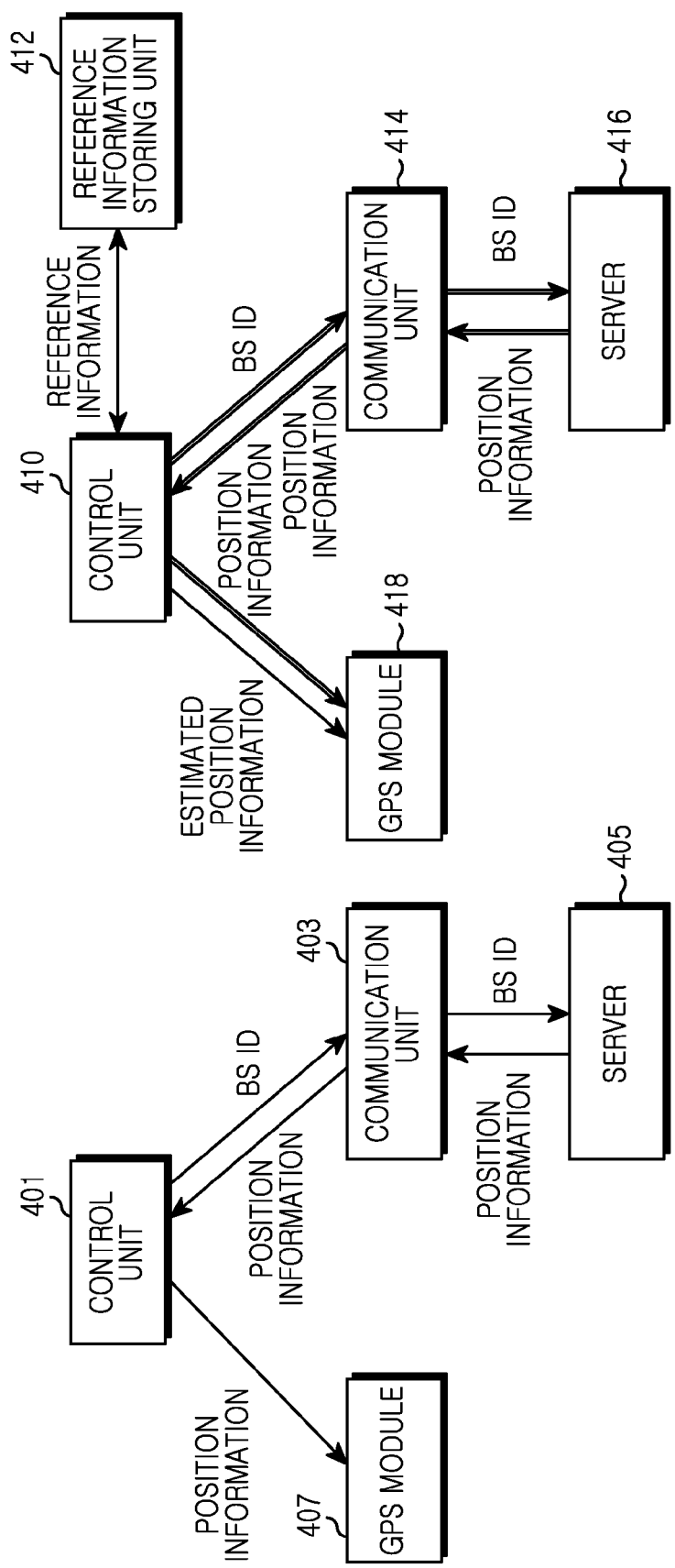
FIG. 4A is a diagram illustrating a process for detecting the position of a satellite by a general portable terminal.
FIG. 4B is a diagram illustrating a process for detecting the position of a satellite by a portable terminal according to an exemplary embodiment of the present invention.

FIG. 4A is a diagram illustrating the comparison between a process for detecting the position of the portable terminal by a general portable terminal in the conventional way. FIG. 4B illustrates a process for detecting the position of the portable terminal by a portable terminal according to an exemplary embodiment of the present invention. In FIG. 4B, a single solid line represents the flow path of the position information estimated by the portable terminal, and a double solid line represents the flow path of the position information received from the position information providing server 416.

Referring to FIG. 4A, the portable terminal uses an assisted GPS mode. A control unit 401 of the portable terminal provides a BS ID through a communication unit 403 to a position information providing server 405 to inquire the position of a base station, and the position information providing server 405 provides position (latitude/longitude) information about the base station corresponding to the BS ID to the portable terminal in response thereto.

Accordingly, the control unit 401 of the portable terminal may provide the GPS module 407 with the position information received through the communication unit 403, and the GPS module 407 may detect the position of the portable terminal by the received position information on the basis of the current position of the portable terminal.

However, when network between the portable terminal and the position information providing server conditions are poor, a packet loss may occur between the portable terminal and the position information providing server; and when an error occurs in the position information providing server, the portable terminal may fail to receive the latitude and longitude information about the BS ID.

Referring to FIG. 4B, the portable terminal uses an assisted GPS mode. A control unit 410 of the portable terminal provides a BS ID through a communication unit 414 to a position information providing server 416 to inquire the position of a base station, and the position information providing server 416 provides position (latitude/longitude) information about the base station corresponding to the BS ID to the portable terminal in response thereto. However, according to an exemplary embodiment, the portable terminal may acquire a position of the portable terminal by estimating the position of the portable terminal using prestored reference information when communication fails with the server.

That is, the control unit 410 detects BS information about an area including the portable terminal, compares the BS information with reference information prestored in a reference information storing unit (memory unit) 412 to obtain position information of the base station, and detects an area where the portable terminal is located based on the comparison outcome.

Accordingly, the GPS module 418 tracks the position of a satellite by the position information estimated by the portable terminal. For example, if the portable terminal can detect its own position on a country-by-country basis, it tracks a satellite detectable in Korea. If receiving information, indicating the location in Gangnam-gu Seoul, from the position information providing server 416 during the process of tracing a satellite, the portable terminal immediately tracks a satellite detectable in Gangnam-gu Seoul.

As described above, the present invention estimates the initial position of a satellite by the position information estimated by the portable terminal based on prestored reference information, thus making it possible to prevent the estimation of the initial position of a satellite from being delayed because the portable terminal fails to receive the position information of the position information providing server due to poor network conditions.

The above-described methods according to the present invention can be implemented in hardware or as software or computer code that can be stored in a recording medium such as a CD ROM, an RAM, a floppy disk, a hard disk, or a magneto-optical disk or downloaded over a network and stored on a non-transitory machine readable medium, so that the methods described herein can be rendered in such software using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method comprising:
identifying base station information received from a base station by a portable terminal;
transmitting, by the portable terminal to a server, a request for a position of the base station corresponding to the identified base station information;
while a response to the request for the position of the base station is pending, detecting, by the portable terminal, an area where the portable terminal is situated by comparing the base station information with reference information stored in the portable terminal;
while the response to the request for the position of the base station is pending, locating a satellite based at least in part on the area where the portable terminal is situated; and
when the response is received before the satellite is located based at least in part on the area, stopping a process of locating the satellite based at least in part on the area where the portable terminal is situated, and locating the satellite based at least in part on an indication of the position of the base station that is contained in the response.

2. The method of claim 1, wherein the reference information relates: a country code to (i) a longitude and latitude of a reference point, and (ii) an indication of at least one line which, in conjunction with the reference point, describes the area.

3. The method of claim 1, further comprising estimating the location of the portable terminal based on a signal from the satellite.

4. The method of claim 1, wherein the reference information is searchable based on the base station information.

5. The method of claim 1, further comprising receiving a signal from the satellite.

6. The method of claim 2, wherein the detecting of the area where the portable terminal is situated comprises:
detecting a reduced radius around the reference point based on the indication of the at least one line; and
wherein the area is determined based on the reduced radius and the reference point.

7. A portable terminal comprising at least one processor coupled to a memory storing reference information, the at least one processor being configured to:
identify base station information received from a base station by the portable terminal;
transmit, by the portable terminal to a server, a request for a position of the base station corresponding to the identified base station information;
while a response to the request for the position of the base station is pending, detect an area where the portable terminal is situated by comparing the base station information with the reference information ;
while the response to the request for the position of the base station is pending, locate a satellite based at least in part on the area where the portable terminal is situated; and
when the response is received before the satellite is located based at least in part on the area, stop a process of locating the satellite based at least in part on the area where the portable terminal is situated, and locate the satellite based at least in part on an indication of the position of the base station that is contained in the response.

8. The terminal of claim 7, wherein the reference information relates: a country code to (i) a longitude and latitude of a reference point, and (ii) an indication of at least one line which, in conjunction with the reference point, describes the area based on which the satellite is located.

9. The terminal of claim 7, wherein the at least one processor is further configured to estimate the location of the portable terminal based on a signal from the satellite.

10. The terminal of claim 7, wherein the reference information is searchable based on the base station information.

11. The terminal of claim 7, wherein the detecting of the area where the portable terminal is situated comprises:
detecting a reference point corresponding to the base station information using the reference information;
detecting a reduced radius around the reference point; and
wherein the area is determined based on the reduced radius and the reference point.

12. The terminal of claim 7, wherein the processor is further configured to receive a signal from the satellite.

13. A method comprising:
identifying base station information for use in searching for satellites based on a communication between a base station and a portable terminal;
detecting a range for searching for the satellites based on reference information stored in the portable terminal, the reference information being searchable based on the base station information, and the reference information relating the base station information to (i) a longitude and latitude of a reference point, and (ii) an indication of at least one line which, in conjunction with the reference point, describes the range for searching for the satellites; and
estimating a position of the portable terminal using geolocational signals from the satellites after the satellites are identified based on the range;
wherein the range is detected based on the reference information when the portable terminal is unable to retrieve a location of the base station from a server; and
wherein the range is detected during an ongoing attempt to retrieve the location of the base station from the server.

14. The method of claim 13, wherein the indication of the at least one line defines a radius around the reference point.

15. The method of claim 13, wherein the detecting of the range comprises detecting a reduced radius around the reference point based on the indication of the at least one line.

* * * * *